(No Model.)

L. A. GILLETT.
GRAIN WEIGHER.

No. 412,382. Patented Oct. 8, 1889.

Witnesses
Inventor
L. A. Gillett
By his Attorneys

UNITED STATES PATENT OFFICE.

LESTER A. GILLETT, OF LEONARDVILLE, KANSAS.

GRAIN-WEIGHER.

SPECIFICATION forming part of Letters Patent No. 412,382, dated October 8, 1889.

Application filed November 6, 1888. Serial No. 290,145. (No model.)

*To all whom it may concern:*

Be it known that I, LESTER A. GILLETT, of Leonardville, in the county of Riley and State of Kansas, have invented a new and useful Improvement in Automatic Grain-Measures, which improvement is fully set forth in the following specification, reference being had to the accompanying drawings.

My invention relates to improvements in automatic grain-measures, in which the measure is emptied and the amount of the grain registered by the weight of grain.

The object of my improvement is to supply an automatic grain-measure that will be simple of construction, compact of form, and very effective of operation. I attain this object by the mechanism illustrated in the accompanying drawings, in which—

Figure 1:
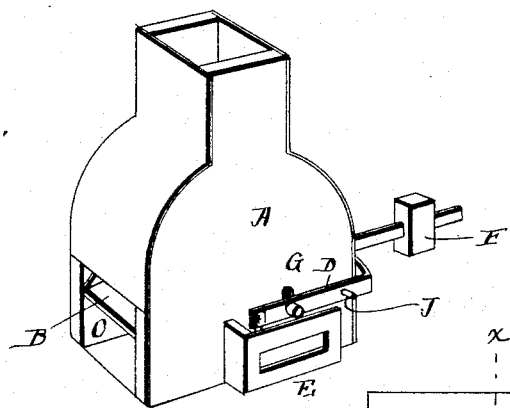
Figure 2:
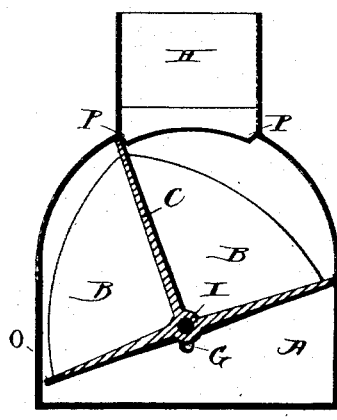
Figure 3:
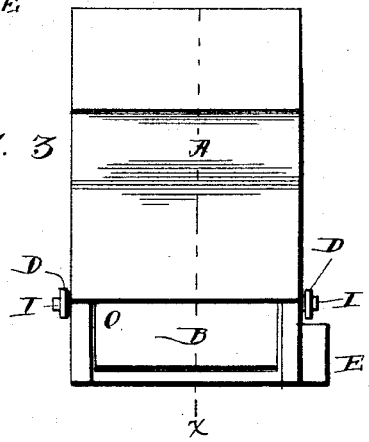
Figure 4:
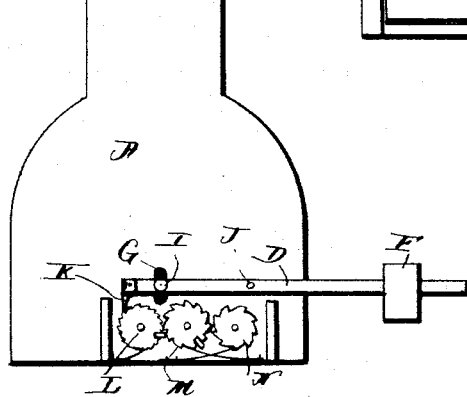

Figure 1 is a perspective view of the entire machine. Fig. 2 is a vertical section taken on the line $x\ x$. Figs. 3 and 4 are side elevations.

Similar letters refer to similar parts throughout the several views.

The measure consists of the box A, with the tray B pivoted on an axle I, passing through the slots G G in box A, said axle having bearings on the ends of a forked lever D, which is fulcrumed on pins J, with the weight at F. The tray B thus acts as a bottom to the box A. The measure is then formed by placing a dividing-board C in the tray B, and above the axle I, so that its top will rest against the side of box A, while one end of the tray B rests against the opposite side, near the bottom. The tray B is made to oscillate freely on the axle I, so that any weight falling upon either side of the dividing-board C will quickly turn it; but to prevent its turning before the desired amount of grain has accumulated, there is a bar H, placed across the center of box A, and just high enough to allow the dividing-board C to slip into one of the notches P P, made between the side of the box A and the end of the bar H, when the tray B is raised by the weight F on the lever D. On the end of one of the forks of lever D is a pawl K, made so as to turn the wheel L in the register E one cog every time the end of the lever is raised and lowered. One revolution of the wheel L turns the wheel M one cog, and one revolution of the wheel M turns the wheel N one cog.

The operation is as follows: The grain coming in at the top of box A falls upon the half of the tray B formed by the dividing-board C, until sufficient weight has accumulated to overbalance the weight at F, when the tray drops and the dividing-board is disengaged from the notches at the end of bar H, allowing the tray to turn and the grain to slide out at the aperture in the box at O. Meanwhile the top of board C is again forced into one of the notches P P, and held there by the weight at F while the opposite end of the tray is being filled, and so the operation continues.

What I claim as my invention, and desire to secure by Letters Patent, is—

1. The combination of the casing having the longitudinally-arranged cross-bar near its mouth or upper end, the oscillating pan or receptacle arranged within the casing and having a transverse shaft extending through vertical slots in the sides of said casing and journaled in the arms of a bifurcated counterweighted lever, and a partition extending upward from the bottom of said pan or receptacle and adapted to engage notches or recesses between the longitudinal cross-bar and the sides of the casing, substantially as set forth.

2. In a grain-meter, the combination of a box or casing having vertically-slotted sides, a forked lever the arms of which are pivoted to the side of the casing and the outwardly-extending arm of which is counterweighted, the oscillating pan or receptacle within the casing having a vertical partition adapted to engage notches between the sides of said casing, and a cross-bar arranged near its mouth or upper end, and a transverse shaft extending through the slots in the sides of the casing and journaled in the arms of the forked lever, and a registering device actuated by a pawl attached to one of the arms of said lever, substantially as set forth.

LESTER A. GILLETT.

Witnesses:
WALTER J. BURTIS,
W. H. SIKES.